United States Patent [19]
Plunkett et al.

[11] 3,932,828
[45] Jan. 13, 1976

[54] ENCAPSULATED COIL AND METHOD OF MAKING THE SAME

[75] Inventors: James P. Plunkett, West Dundee, Ill.; Joseph T. Latchford, Bowmanville, Canada

[73] Assignee: Coils, Inc., Huntley, Ill.

[22] Filed: Aug. 5, 1974

[21] Appl. No.: 495,034

Related U.S. Application Data

[63] Continuation of Ser. No. 408,766, Oct. 23, 1973, abandoned.

[52] U.S. Cl. ................. 336/96; 29/602; 336/192; 339/276 C
[51] Int. Cl.² ........................................ H01F 15/10
[58] Field of Search ............ 336/107, 96, 205, 192, 336/198, 208; 339/276 C, 220 C, 220 R, 217 S; 29/602, 605; 174/87, 90

[56] References Cited
UNITED STATES PATENTS

| | | | |
|---|---|---|---|
| 1,813,154 | 7/1931 | Franz | 336/107 X |
| 2,802,193 | 8/1957 | Biba, Jr. et al. | 336/192 X |
| 3,054,027 | 9/1962 | Barrick et al. | 336/192 X |
| 3,315,198 | 4/1967 | Biesma et al. | 336/192 |
| 3,359,520 | 12/1967 | Foerster | 336/192 |
| 3,450,828 | 6/1969 | Joly | 174/90 X |
| 3,544,940 | 12/1970 | Davis | 336/208 X |
| 3,566,322 | 2/1971 | Horbach | 336/192 X |
| 3,609,616 | 9/1971 | Dumeige | 336/208 X |
| 3,660,791 | 5/1972 | Davis | 336/205 X |
| 3,800,172 | 3/1974 | Artin et al. | 336/192 X |

FOREIGN PATENTS OR APPLICATIONS

| | | | |
|---|---|---|---|
| 585,783 | 2/1947 | United Kingdom | 336/192 |
| 52,684 | 1/1942 | Netherlands | 336/192 |

*Primary Examiner*—Thomas J. Kozma
*Attorney, Agent, or Firm*—Dressler, Goldsmith, Clement & Gordon, Ltd.

[57] ABSTRACT

A plastic bobbin for the coil is formed with a terminal-receiving block extending out from the bobbin axially from one bobbin flange. The bobbin is wound with a coil the end wires of which are temporarily secured in slits in the edge of a bobbin flange. Terminal tubes which are in the form of eyelet-blanks, each having one end headed, are inserted through the block so that the unheaded end projects from the block into planar alignment with the coil. A tongue is cut axially from the end of each tube and bent back to form a hook. The end wires are slipped under the hooks and welded. Lead wires are inserted into the eyelets which are crimped upon the lead wires to secure the lead wires and make a good connection. A quick-setting cement is applied between the lead wires and the block, into which they extend. The bobbin, and the portion of the block in planar alignment with it are then encapsulated with plastic.

5 Claims, 4 Drawing Figures

ENCAPSULATED COIL AND METHOD OF MAKING THE SAME

This is a continuation of application Ser. No. 408,766, filed Oct. 23, 1973, abandoned upon filing this application.

INTRODUCTION

The present invention relates particularly to the inexpensive production of coils of fine wire, such as coils which are used on timer motors for example. No doubt there have been many forms of terminal anchoring and connecting structures. One of the most widely used has involved securing to a coil a tab or card of insulative material to which the two terminals had been secured as by riveting or upsetting. These, or at least those known, have not been well adapted for automatic production of the coil assemblies. According to the present invention, a coil structure, and an assembly method for it, have been worked out which facilitate very low cost of production of coil assemblies, partly because of being well suited for production by machinery with only a minimum of human intervention.

To this end, the construction includes, as one piece molded of plastic, a bobbin with a terminal-receiving thread or block extending axially away from the periphery of one flange of the bobbin. Terminals in the form of eyelet-blanks which have been upset at one end, only, to form heads thereon, are inserted through stepped apertures in the terminal block, so that the unheaded end of the tube extends into planar alignment with the coil. On the side of each tube most remote from the coil, and hence most accessible, a tongue is cut and bent outwardly and doubled back on the tube to form a retaining hook or lug. The two coil ends may now be applied, one under each such lug, preferably being secured and connected by spot welding. Two lead wires are now connected, one being inserted into the headed end of each terminal tube, extending nearly through the tube, with the insulation of the lead extending into the aperture of the terminal block and against the head of the terminal. The tube can be crimped against the wire of the lead wire to make a good electric contact and hold the lead wire in the terminal.

The advantages and objects of the invention may be more apparent from the following description and from the drawings.

DESIGNATION OF FIGURES

INTENT CLAUSE

Although the following disclosure offered for public dissemination is detailed to ensure adequacy and aid understanding, this is not intended to prejudice that purpose of a patent which is to cover each new inventive concept therein no matter how others may later disguise it by variations in form or additions or further improvements. The claims at the end hereof are intended as the chief aid toward this purpose, as it is these that meet the requirement of pointing out the parts, improvements, or combinations in which the inventive concepts are found.

BACKGROUND OF INVENTION

The invention concerns the economical and reliably satisfactory connecting of relatively heavy lead wires 11 to the wire ends 12 of a fine-wire coil 13 on a bobbin such as the bobbin portion 14 of the present invention.

DESCRIPTION OF PREFERRED FORM OF PRESENT INVENTION

Figure 1:
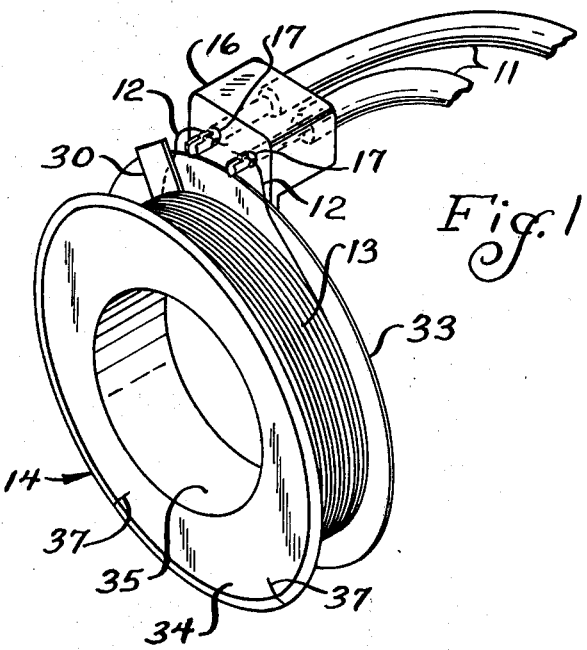
FIG. 1 is a view, of perspective nature, of a coil of the present invention before encapsulating.
Figure 3:
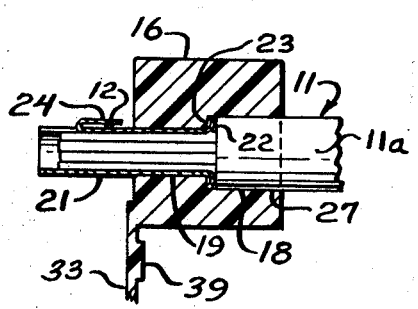
FIG. 3 is a fragmentary vertical sectional view approximately through one of the terminals.

According to the present invention the bobbin portion 14 is molded in one piece with a terminal block portion 16. As seen best in FIG. 1, the terminal block portion 16 has two apertures 17 therethrough for the lead wires 12 and their terminals. As seen best in FIG. 3, each aperture is stepped, including a larger diameter portion 18 and a smaller diameter portion 19. A tubular terminal 21 is headed at one end only and is inserted small end first through an aperture in the terminal block 16 until its head 22 comes to rest on the step 23 of the aperture. While held in this position, a tongue 24 is cut from the small end of the tubular terminal 21 and folded back approximately as seen in FIG. 3, thus providing a hook. A wire end 12 is secured under each hook or tongue 24, the coil 13 having been prewound on the bobbin or spool portion 14. Preferably spot welding is used through the tongue 24 to secure each coil end 14 permanently in place and ensure an electrically excellent connection.

Figure 2:
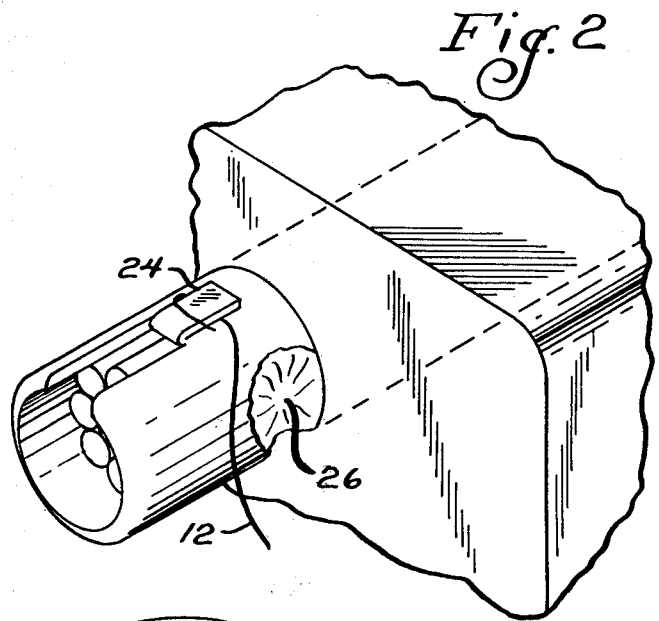
FIG. 2 is a view on a much larger scale of one of the terminals as shown in FIG. 1 and immediately adjacent parts.

Into each tubular terminal 21, from its headed end, is inserted one of the lead wires 11. The strands of the wire preferably extend almost through the terminal 21 and are secured therein by crimping 26 at one side as seen in FIG. 2. The crimping also ensures a good electrical connection. Preferably the insulation 11a of lead wire 11 extends into the larger portion 18 of the aperture, into which it fits snugly, and is secured therein by an adhesive at the interface 27.

Figure 4:
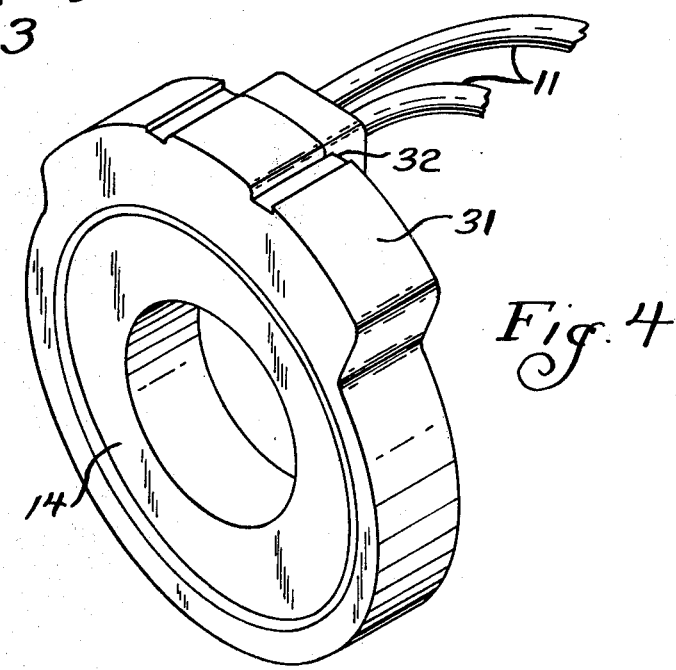
FIG. 4 is a view similar to FIG. 1 but showing the coil encapsulated.

The coil thus protected is preferably given a protective encapsulation 31, as seen in FIG. 4. The encapsulation preferably extends along a small part of the length of the terminal block 16, at least on the under side, and sides thereof (as seen at 32 in FIG. 4), giving structural reinforcement for the connection of the terminal block 16 to the rear flange 33 of the bobbin. The rear flange 33, the front flange 34, and the sleeve portion 35 are of course parts of a one-piece bobbin or spool.

MACHINE PRODUCTION

The encapsulated coil of this invention is well adapted for a very low-cost production on a turret machine. The bobbins, prewound with the coil 13, can be loaded into the machine at one station. Preferably one or more slots 37 is provided at the periphery of one of the flanges 33 or 34, into which the relatively free coil end of coil 12 may be secured. Both may thus be secured if desired, but the starting end is inherently secured and in fact is protected from the coil by a strip of insulating tape 30 which may be an adhesive tape to secure the starting end initially. At another station or stations the eyelets are inserted, preferably automatically. At successive stations, the hook 24 is formed on the eyelet, the lead wires 11 are inserted into the terminal tubes 21, the tubes are inwardly crimped to clamp against the strands of the lead wires, and the coil assembly is positioned for access to the hooks 24. At the present time it is contemplated that the threading of the coil ends 12 under the hooks 24 will be a manual operation. Next, the machine applies welding electrodes to each terminal 21 and its tongue 24 to spot weld through the tongue and the wire end 17 to the terminal. Finally, it is preferred that the machine connect the two exposed ends of the lead wires 11 to test facilities for testing the coil, the machine ejecting those which have short circuits or other defects. Finally, the coils may be transferred, preferably automatically, to encapsulating facilities.

The machine preferably applies a droplet of adhesive to the junction of terminal block 16 and the insulation portion of each lead wire therein, to cement the insulation firmly to the terminal block 16.

FURTHER DETAILS

The material at present preferred for the bobbin is Nylon (Dupont's Zytel 101 or equivalent).

Preferably the walls of the spool portion of the bobbin are very thin, and tapered toward their edges. Low flat ribs 39 may be provided on the outer side of the flange carrying terminal block 16 for aiding in closing the mold on the bobbin for encapsulation.

The adhesive at present preferred for bonding the leadwire insulation (polyvinyl chloride) within the terminal block 16 is Loctite cyanoacrylate adhesive (X 407) or equivalent.

The preferred encapsulating plastic is a thermo-setting resin, such as an epoxy molding compound.

The bare ends of the lead wires 11 have preferably been tinned for easy insertion through the terminals and to improve the electrical contact. Heat from the welding mentioned may cause some fusion bonding to the terminal, and can be made to if found necessary.

Pull-out tests indicate that the leadwire will break before the wire will pull out. This is not attributed so much to the adhesive as to the gripping or bonding of the strands, and the positive lock-in of the terminal 2 by the tongue 24, especially when welded down. It forms an enlargement preventing withdrawal, i.e. preventing excessive return or rearward movement of the terminal in terminal block 16.

We claim:

1. A coil assembly including a bobbin and a coil of wire thereon; the bobbin comprising a one-piece molding of plastic insulating material having parallel annular flanges extending radially outwardly from a sleeve-like portion jointly forming a spool on which the coil is wound between the flanges, and a terminal block extending outwardly in an axial direction from the peripheral portion of one of the flanges with a pair of terminal-receiving stepped apertures each having a reduced diameter portion adjacent said flange and an enlarged diameter portion on an opposite end of said block; a tubular terminal having an enlarged head at one end received in said enlarged diameter portion and extending through said reduced-diameter portion of each aperture into the zone in planar relationship with the coil; each terminal having a tongue cut backwardly from an opposite end of the tubular portion thereof and folded back and receiving a coil end; a lead wire extending into each terminal with its insulation extending into the larger-diameter portion of the aperture receiving that terminal and adhered to the wall of said aperture, each terminal being inwardly crimped to secure the lead wire therein and make good contact with the lead wire.

2. The method of assembling a bobbin, a coil of wire thereon and lead wires, comprising supplying a wound bobbin comprising a one-piece molding having parallel annular flanges extending radially outwardly from a sleeve-like portion jointly forming a spool on which the coil is wound between the flanges, and a terminal block extending outwardly in an axial direction from the peripheral portion of one of the flanges with a pair of terminal-receiving stepped apertures each having a reduced diameter portion adjacent said flange and an enlarged diameter portion on an opposite end of said block; inserting a terminal having an enlarged head at one end received in said enlarged diameter portion and extending through said reduced-diameter portion of each aperture into the zone in planar relationship with the coil; cutting each terminal backwardly from the end of the tubular portion to form a tongue and folding the tongue outwardly and rearwardly, securing of a coil-wire end under each tongue, forming a reliable connection of each coil-wire end to its terminal, inserting a lead wire into each terminal with its insulation extending into the larger-diameter portion of the aperture receiving that terminal and adhering it to the wall of said aperture, and crimping each terminal inwardly to secure the lead wire therein and make good contact with the conductive portion of the lead wire.

3. A coil assembly as defined in claim 1, further including encapsulating material enclosing the coil and exposed portions of said terminals.

4. A coil assembly as defined in claim 3, in which said terminal block is devoid of encapsulating material leaving the terminal block partly exposed.

5. The method as defined in claim 2, further including encapsulating said coil and exposed portion of said terminals with a thermo-setting resin.

* * * * *